(12) United States Patent
Kim

(10) Patent No.: US 7,618,222 B2
(45) Date of Patent: Nov. 17, 2009

(54) COLLATED FASTENER STRIPS WITH OPPOSING WIRE CONNECTORS

(76) Inventor: Chi Hyun Kim, 89, Paho Dong, Dalseo Gu, Daegu (KR)

( * ) Notice: Subject to any disclaimer, the term of this patent is extended or adjusted under 35 U.S.C. 154(b) by 276 days.

(21) Appl. No.: 11/545,137

(22) Filed: Oct. 10, 2006

(65) Prior Publication Data

US 2007/0207011 A1  Sep. 6, 2007

Related U.S. Application Data

(60) Provisional application No. 60/778,126, filed on Mar. 1, 2006.

(51) Int. Cl.
 *F16B 15/08* (2006.01)
(52) U.S. Cl. ...................... 411/442; 206/345
(58) Field of Classification Search ............... 411/442; 206/343–345
 See application file for complete search history.

(56) References Cited

U.S. PATENT DOCUMENTS

| | | | |
|---|---|---|---|
| 159,777 A | 2/1875 | Sturtevant | |
| 2,909,781 A * | 10/1959 | Ollig et al. ............ | 206/343 |
| 3,083,369 A * | 4/1963 | Peterson ............... | 206/345 |
| 3,212,632 A * | 10/1965 | Baum et al. ........... | 206/346 |
| 3,471,008 A | 10/1969 | Reich et al. | |
| 3,515,271 A | 6/1970 | Bader | |
| 4,343,579 A | 8/1982 | Shelton et al. | |
| 4,442,965 A | 4/1984 | Leistner | |
| 4,679,975 A | 7/1987 | Leistner | |
| 4,711,980 A | 12/1987 | Leistner | |
| 4,804,088 A | 2/1989 | MacDonald | |
| 4,836,372 A | 6/1989 | Shelton | |
| 4,913,611 A | 4/1990 | Leistner | |
| 4,971,503 A | 11/1990 | Barnell et al. | |
| 5,056,976 A | 10/1991 | Sygnator et al. | |
| 5,149,237 A | 9/1992 | Gabriel et al. | |
| 5,482,420 A | 1/1996 | Gabriel et al. | |
| 5,733,085 A | 3/1998 | Shida et al. | |
| 5,842,419 A | 12/1998 | Puschnerat | |
| 5,909,993 A | 6/1999 | Leistner | |
| 6,082,536 A | 7/2000 | Ito et al. | |
| 6,557,703 B1 | 5/2003 | Leitner | |
| 6,585,113 B2 * | 7/2003 | Shiu .................. | 206/344 |
| 6,758,018 B2 | 7/2004 | Sutt, Jr. | |
| 6,880,700 B2 | 4/2005 | Osuga et al. | |
| 6,880,723 B2 | 4/2005 | Osuga et al. | |
| 6,896,135 B2 | 5/2005 | Leitner | |

* cited by examiner

*Primary Examiner*—Flemming Saether
(74) *Attorney, Agent, or Firm*—Sand & Sebolt

(57) ABSTRACT

A collated strip of fasteners for use in a powered nail gun. Each fastener has a head and an elongated shank extending outwardly therefrom and the plurality of fasteners are disposed aligned one with the other. At least two wire members are secured to the shanks of the aligned plurality of fasteners so as to form a strip of connected fasteners. A first wire member is secured to a first side of each of the shanks and a second wire member is secured to a second and opposite side of each of the shanks. The first and second wire members are spaced a distance apart from each other so that a stable strip of fasteners is formed. A third wire member may also be secured to the first side of the shanks a spaced distance from the first wire member. In this instance, the second wire member is secured to the second and opposite side of the shanks in a position intermediate the first and third wire members.

14 Claims, 2 Drawing Sheets

COLLATED FASTENER STRIPS WITH OPPOSING WIRE CONNECTORS

CROSS REFERENCE TO RELATED APPLICATIONS

This application claims priority from U.S. Provisional Application Ser. No. 60/778,126 filed Mar. 1, 2006; the disclosure of which is incorporated herein by reference.

BACKGROUND OF THE INVENTION

1. Technical Field

This invention generally relates to fasteners. More particularly, the invention relates to a collated strip of nails for use in association with a powered nail gun. Specifically, the invention relates to a collated strip of nails that is connected together by at least a pair of wires welded on opposing sides of the shanks of the nails in the strip.

2. Background Information

It is customary for framing and trim carpenters to use gas powered, electric or pneumatically powered nail guns to drive nails into the pieces of wood they are connecting together. In order for the nails to be loaded into the nail gun, they are formed into a connected or collated strip which is then fed into the magazine of the gun. Several patents have addressed the formation of the collated strip of nails.

U.S. Pat. No. 6,880,700 to Osuga et al discloses a collated strip of nails that are held together with strips of paper or resin tape. The strips of tape are positioned proximate the heads and tips of the nails and are glued thereto. Adhesive tape connections between the nails in the strip are also disclosed in U.S. Pat. No. 6,880,700 to Osuga et al.; U.S. Pat. No. 4,343,579 to Shelton; U.S. Pat. No. 4,836,372 to Shelton; U.S. Pat. No. 3,515,271 to Bader; and U.S. Pat. No. 6,082,536 to Ito et al. The paper tapes disclosed in these prior patents tend to flag, i.e., to break off in a manner that leaves small pieces of the tape and/or adhesive sticking out from under the head of the nail. This tends to detract from the appearance of the finished product.

U.S. Pat. No. 4,913,611 to Leistner discloses a collated strip of nails connected together by a plurality of linked plastic collars. This type of linkage has been found undesirable because of the quantity of small plastic pieces that shatter off the strip as the nails are driven into the wood substrate by the nail gun. The plastic pieces become projectiles during the actual firing of the nail gun and need to be cleaned up after the project is completed.

U.S. Pat. No. 5,733,085 to Shida et al discloses the use of a special adhesive strip to connect the nails to each other. The adhesive in the strip includes a polymer such as talc, wood flour, thermoplastic and the like, which acts as a stiffening agent for the adhesive strip.

Various inventors have proposed using thin wires to connect the nail shanks together. For example, Gabriel et al. disclosed in U.S. Pat. No. 5,482,420, using a pair of wires that are welded to the individual shanks on one side of a strip of screws. The wires are welded proximate the heads and the tips of the screws which are disposed substantially at right angles to the wires. Leistner discloses in U.S. Pat. No. 5,909,993, a method of connecting a plurality of clipped nails together which includes forming grooves in one side of the shanks of the plurality of nails and then welding wire strips into those grooves.

U.S. Pat. Nos. 6,896,135 and 6,557,703 to Leitner, disclose the use of two or more spaced apart wires that are welded to the shanks of a plurality of nails. In this instance, the nails are disposed at an angle other than ninety degrees to the wires and the wires are spaced approximately 6.5 mm to 7.5 mm apart from each other. The wires are all disposed on the same side of the shanks of the nails. U.S. Pat. No. 6,758,018 to Sutt also discloses using a pair of spaced apart wires to secure a plurality of nails together. The nails are again disposed at an angle other than ninety degrees to the wires and the wires on the same side of the shanks of the nails. Sutt also discloses using a plastic binding element and a paper binding element to form a collated package of nails.

Finally, U.S. Pat. No. 4,679,975 to Leistner discloses the use of a pair of thermoplastic-coated wires that are adhered to the shanks of a plurality of nails. Yet again, the wires are disposed on a single side of the shanks of the plurality of nails. The wire-connected collated packages of nails are designed to be coiled and then loaded into the nail guns. One of the problems experienced with this type of connector is that a balance has to be found in the wire selected. The wire has to be strong enough to hold the collated package together in sufficiently rigid structure to feed easily through the nail gun, yet weak enough to break as the nail is fired from the nail gun.

There is therefore a need in the art for an improved connector mechanism for a collated strip of nails with the connector being sufficiently rigid for the collated strip to feed easily through a nail gun, but being sufficiently weak enough for the individual nails to break off the collated strip as the nail gun is fired.

SUMMARY OF THE INVENTION

The present invention comprises a collated strip of fasteners. Each fastener has a head and an elongated shank extending outwardly therefrom and the plurality of fasteners being aligned one with the other so that the heads are substantially aligned and the shanks are substantially aligned. At least a pair of wire members is secured to the shanks of the aligned plurality of fasteners so as to form a strip of connected fasteners. A first wire member is secured to a first side of each of the shanks and a second wire member is secured to a second and opposite side of each of the shanks. The first and second wire members are spaced a distance apart from each other so that a stable strip of fasteners is formed. A third wire member may also be secured to the first side of the shanks a spaced distance from the first wire member. The second wire member is then secured to the second and opposite side of the shanks in a position intermediate the first and third wire members.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

Similar numbers refer to similar parts throughout the drawings.

DETAILED DESCRIPTION OF THE INVENTION

Figure 1:
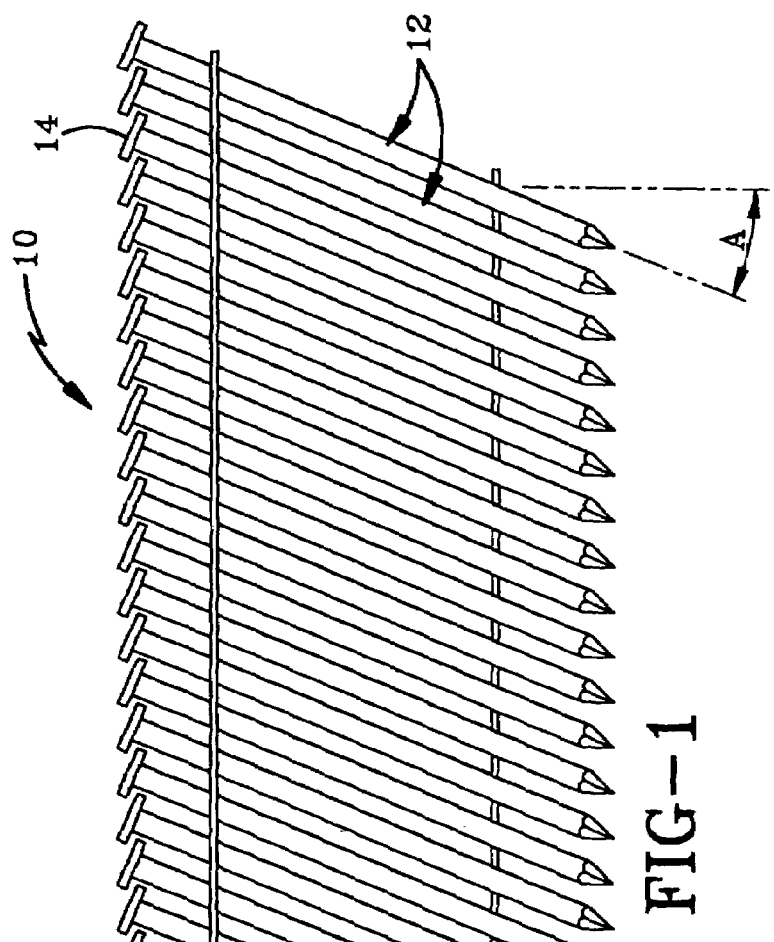
FIG. 1 is a front view of a collated strip of nails including the opposing wire connectors in accordance with the present invention.
Figure 2:
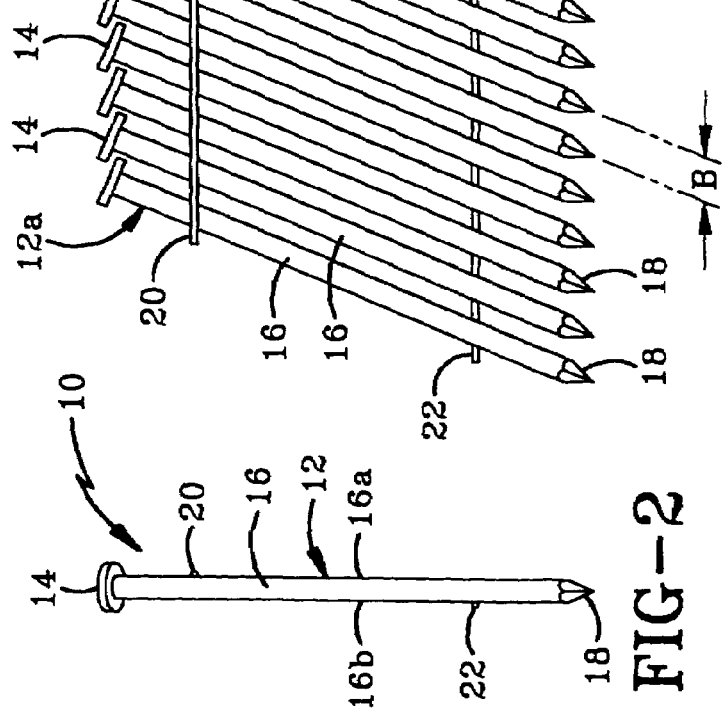
FIG. 2 is a left side view of the collated strip of nails showing the positioning of the opposing wire connectors.

Referring to FIGS. 1 and 2, there is shown a collated strip of fasteners in accordance with the present invention and generally indicated at 10. Strip 10 is formed from a plurality of fasteners 12, each of which includes a head 14 and an elongated shank 16 that terminates in a pointed tip 18. Fasteners 12 preferably are nails that have rounded heads 14 and substantially smooth shanks 16. It will, of course, be understood that clipped-headed nails can also be secured by the connectors of the present invention. Furthermore, the fasteners 12 may be screws that include a plurality of threads on at least a portion of the shanks 16 thereof.

In accordance with a specific feature of the present invention, the plurality of fasteners is connected together by at least a pair of wires 20, 22. First and second wires 20, 22 need to be thick enough to hold fasteners 12 in a stable and secure manner, yet need to be able to be broken by the action of the nail gun. It has been found that a thickness of wire between 0.6 mm and 0.8, and preferably of 0.7 mm is suitable for this application.

The first wire 20 is welded to shanks 16 of fasteners 12 proximate heads 14 thereof; and second wire 22 is welded to shanks 16 proximate tips 18 thereof. First wire 20 is welded to shanks 16 at a distance of between 8 mm and 10 mm from heads 14. Preferably, first wire 20 is welded at a distance of 9 mm from heads 14. The first wire 20 is welded onto a first side 16a of shank 16 of each of the fasteners 12 in the strip 10, so that when strip 10 is viewed from the front (FIG. 1), the first wire 20 is disposed in front of strip 10. The second wire is welded onto a second side 16b of shank 16 of each of the fasteners 12 in the strip 10. Second wire 22 is welded to second side 16b at a distance of between 50 mm and 54 mm from heads 14. Preferably, second wire 22 is welded to shanks 16 at a distance of 52 mm from heads 14. When strip 10 is viewed from the front, second wire 22 is disposed behind the strip 10. As is shown in FIG. 1, fasteners 12 are disposed at an angle "A" of between 15° and 25° to wires 20, 22. Preferably, fasteners 12 are disposed at an angle of 21° to first and second wires 20, 22. This is done in order to allow the heads 14 of fasteners 12 to be angled relative to the wires and to be nested relative to each other so that fasteners 12 can be easily shot out of the nail gun without interfering with each other.

Furthermore, the arrangement of heads 14 allows the spacing "B" between adjacent fasteners 12 to be reduced. In the preferred embodiment of the invention, adjacent fasteners are retained at a distance of between 5 mm and 6 mm apart, and preferably at 5.8 mm apart. Strip 10 is loaded into the nail gun (not shown) in such a manner that fastener 12a would be the first fastener shot out of the gun. While the fasteners 12 preferably are oriented in this manner, it will be understood that wires 20, 22 could, alternatively, be welded to a plurality of fasteners in such a manner that the fasteners were disposed substantially at right angles to wires 20,22. In this latter instance, shanks 16 of the fasteners 12 would have to be disposed a greater distance apart from each other to ensure that heads 14 of adjacent fasteners could clear each other as fasteners 12 are shot out of the gun.

It has been found that when wires 20, 22 are welded onto opposite sides of the fasteners 12 in the manner shown in FIGS. 1 and 2, the resulting strip 10 is strong enough and stable enough to feed easily through the magazine of a nail gun. The positioning of wires 20, 22 on opposite sides of the shanks 16 of fasteners 12 reduces the tendency of strip 10 to twist and warp as it is fed into and through the nail gun. Furthermore, this arrangement of the wires on opposite sides of the shanks 16 allows for the selection of wires 20, 22 that are relatively thin and therefore sufficiently weak enough to allow the fasteners, such as fastener 12a, to be broken off strip 10 and be fired into a piece of wood (not shown). The small remnants of wires 20, 22 that break off strip 10 with any one of the fasteners 12 fired from the nail gun tend to be driven into the wood with the fasteners 12. Consequently, there is little to no debris that remains on the upper surface of the wood when the job is complete.

Figure 3:
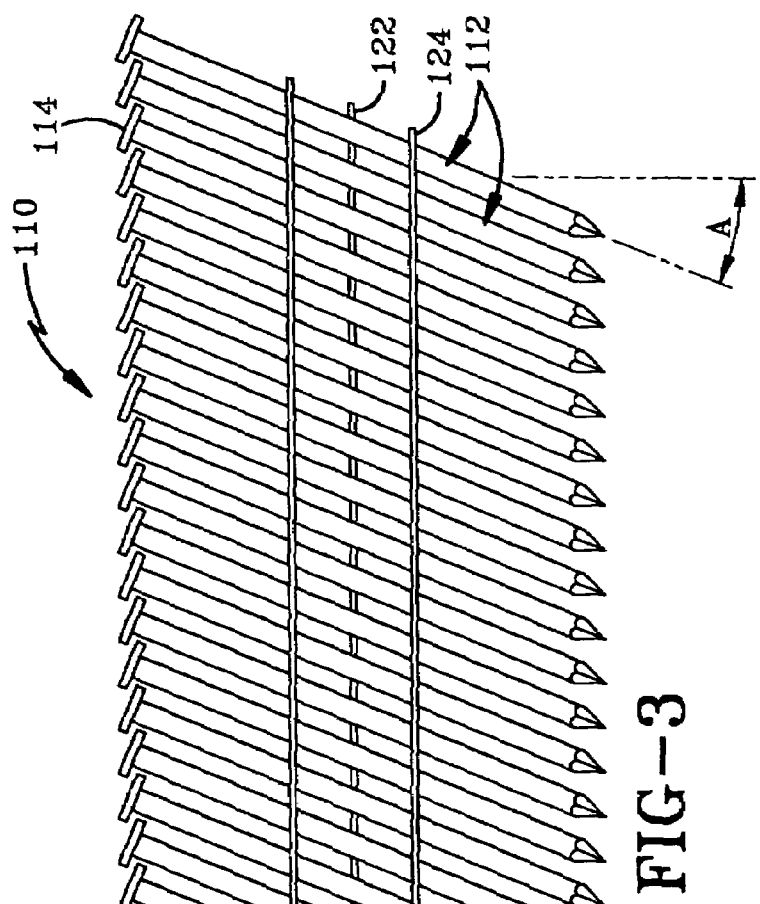
FIG. 3 is a front view of a second embodiment of a collated strip of nails and including the opposing wire connectors in accordance with the present invention.
Figure 4:
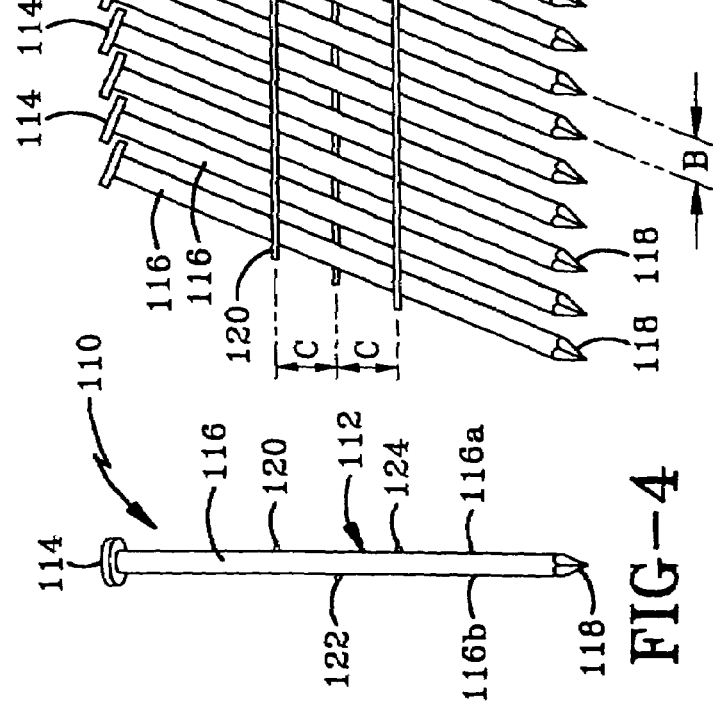
FIG. 4 is a left side view of the collated strip of nails of FIG. 3 and showing the positioning of the opposing wire connectors.

A second embodiment of a collated strip of fasteners is shown in FIGS. 3 and 4 and is generally indicated at 110. Strip 110 comprises a plurality of fasteners 112, each having a rounded head 114 and an elongated shank 116 that terminates in a pointed tip 118. In accordance with a specific feature of the present invention, a plurality of wires are welded on opposing sides of the fasteners 112 in strip 110. In this instance, a first wire 120 and third wire 124 are welded onto a first side 116a of shank 116 of each fastener 112; and a second wire 122 is welded onto a second, and opposite side 116b of the shank 116 of each fastener 112. Second wire 122 is disposed intermediate first and third wires 120, 124. Wires 120, 122 and 124 are welded to shanks 116 around an portion that lies substantially centrally between heads 114 and tips 118. In the preferred embodiment of the invention, first wire 120 is welded to shanks 116 at a distance of approximately 22 mm from heads 114, second wire 122 is welded at a distance of approximately 31 mm from heads 114, and third wire 124 is welded at a distance of approximately 40 mm from heads 114. The distance "C" (FIG. 3) between the first and second wires 120, 122 is substantially equal to the distance "C" between the second and third wires 122, 124, and that distance "C" is approximately 9 mm.

As with the first embodiment, it can be seen in strip 110 that fasteners 112 are again retained at an angle "A" that is other than ninety degrees to wires 120, 122 and 124. Preferably fasteners 112 are retained at an angle "A" of approximately 21° to first, second and third wires 120, 122, 124; and fasteners 112 are again spaced a distance "B" apart. The distance "B" is again approximately 5.8 mm. However, it is possible to orient the fasteners substantially at right angles to wires 120, 122 and 124. When viewed from the front (FIG. 3), first and second wires 120, 122 are disposed in front of strip 110 and third wire 124 is disposed behind strip 110. The positioning of wires 120, 122 and 124 proximate the middle of the shanks 116 and substantially equally spaced apart from each other, further strengthens the strip 110 and allows it to be easily fed into the magazine of a nail gun. Wires 120, 122 and 124 are again between 0.6 mm and 0.8 mm thick and preferably are 0.7 mm thick. The wires are therefore strong enough to retain fasteners 112 in a secure and stable manner for feeding into and through the nail gun, yet weak enough to allow the fasteners 112 to be easily broken off from strip 110 and shot out of the nail gun.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A collated strip of fasteners comprising:
   a plurality of fasteners, each fastener having a head and an elongated shank extending outwardly therefrom; said fasteners being disposed aligned one with the other so that the heads are substantially aligned and the shanks are substantially aligned;

at least a pair of wire members secured to the shanks of the aligned fasteners to form a connected strip of rigid fasteners; wherein a first of the wire members is secured on a first side of each of the shanks; and a second of the wire members is secured on a second and opposite side of each of the shanks of the fasteners;

a third wire member being secured to the first side of the shanks of the fasteners and spaced a distance apart from the first wire member;

wherein the first, second, and third wire members are welded to the shanks; and, wherein the second wire member is secured to the second side of the shanks and in a position disposed substantially intermediate the first and third wire members.

2. The collated strip as defined in claim 1, wherein the first wire member is welded to the first side of the shanks at a distance of 22 mm from the heads of the fasteners and the third wire member is welded to the first side of the shanks at a distance of 40 mm from the heads of the fasteners.

3. The collated strip as defined in claim 2, wherein the second wire member is welded to the second side of the shanks at a distance of 9 mm from the first wire member and 9 mm from the third wire member.

4. The collated strip as defined in claim 1, wherein each of the shanks has a length extending between the head and tip thereof; and wherein the first, second and third wire members are secured to each of the shanks around a midpoint in the length thereof.

5. The collated flip defined in claim 1, wherein the fasteners are disposed at an angle of between 15° and 25° to the first and second wire members.

6. The collated strip as defined in claim 5, wherein the fasteners are disposed at an angle of 21° to the first and second wire members.

7. The collated strip defined in claim 5, wherein the heads of the plurality of fasteners are substantially nested one within the other.

8. The collated strip a defined in claim 7, wherein the heads of fasteners in adjacent pairs thereof overlap each other.

9. The collated skip defined in claim 1, wherein the shanks of the fasteners in the strip are separated from each other by a spaced distance.

10. The collated strip as defined in claim 9, wherein the distance between adjacent shanks in the strip is between 5 mm and 6 mm.

11. The collated strip as defined in claim 1, wherein the first and second wire members are each approximately 0.7 mm in diameter.

12. The collated strip of fasteners as defined in claim 1, wherein the first and second wire members are welded to the shanks.

13. The collated strip as defined in claim 12, wherein the first wire member is welded to the shanks proximate the heads of the fasteners.

14. The collated strip as defined in claim 12, wherein each of the shanks terminates in a tip; and wherein the second wire member is welded to the shanks proximate the tips thereof.

* * * * *

UNITED STATES PATENT AND TRADEMARK OFFICE
CERTIFICATE OF CORRECTION

PATENT NO. : 7,618,222 B2
APPLICATION NO. : 11/545137
DATED : November 17, 2009
INVENTOR(S) : Chi Hyun Kim It is certified that error appears in the above-identified patent and that said Letters Patent is hereby corrected as shown below:

Column 6, line 1, change "flip" to "strip" -- The collated strip defined in claim 1 . . .

Column 6, line 7, add "as" -- The collated strip as defined in claim 5 . . .

Column 6, line 10, change "a" to "as" -- The collated strip as defined in claim 7 . . .

Column 6, line 12, change "skip" to "strip" -- The collated strip defined in claim 1 . . .

Signed and Sealed this

Twenty-sixth Day of January, 2010

David J. Kappos
*Director of the United States Patent and Trademark Office*